United States Patent
Rawat et al.

(10) Patent No.: US 10,191,770 B2
(45) Date of Patent: Jan. 29, 2019

(54) MAINTENANCE TASKS BASED ON DEVICE ROLE

(71) Applicant: Microsoft Technology Licensing, LLC, Redmond, WA (US)

(72) Inventors: Anshul Rawat, Kirkland, WA (US); Tyler Joseph Donahue, Bellevue, WA (US); Richard Michael Gonzales, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 15/267,043

(22) Filed: Sep. 15, 2016

(65) Prior Publication Data

US 2017/0308400 A1 Oct. 26, 2017

Related U.S. Application Data

(60) Provisional application No. 62/326,398, filed on Apr. 22, 2016.

(51) Int. Cl.
*G06F 9/48* (2006.01)
*G06F 8/65* (2018.01)
*G06F 8/656* (2018.01)

(52) U.S. Cl.
CPC .............. *G06F 9/4881* (2013.01); *G06F 8/65* (2013.01); *G06F 8/656* (2018.02)

(58) Field of Classification Search
None
See application file for complete search history.

(56) References Cited

U.S. PATENT DOCUMENTS

| 7,555,551 | B1 | 6/2009 | McCorkendale et al. |
| 7,610,366 | B2 * | 10/2009 | Wilson, Jr. ............... G06F 8/65 709/220 |
| 7,624,393 | B2 | 11/2009 | Egan et al. |
| 7,676,831 | B2 * | 3/2010 | Britton ............... G06F 21/6236 713/182 |
| 7,814,490 | B2 | 10/2010 | Capek et al. |
| 7,895,592 | B2 * | 2/2011 | Subramanian ........... G06F 8/65 717/100 |
| 8,161,150 | B2 | 4/2012 | Kim |
| 8,176,176 | B1 | 5/2012 | Chan |
| 8,261,266 | B2 * | 9/2012 | Pike .................... G06F 9/44505 709/223 |
| 8,473,956 | B2 | 6/2013 | Kindel et al. |

(Continued)

OTHER PUBLICATIONS

"International Search Report and the Written Opinion" cited in PCT Application No. PCT/US2017/027838 dated Sep. 20, 2017.

(Continued)

*Primary Examiner* — Van H Nguyen
(74) *Attorney, Agent, or Firm* — Workman Nydegger

(57) ABSTRACT

Updating a computing device. The method includes identifying a defined computing system role for the computing device. The method further includes, based on the defined computing system role for the computing device, identifying a schedule for performing maintenance tasks for the computing device at the computing device corresponding to the defined computing role for the computing device. The method further includes performing one or more maintenance tasks for the computing device according to the identified schedule.

19 Claims, 2 Drawing Sheets

(56) References Cited

U.S. PATENT DOCUMENTS

| | | | |
|---|---|---|---|
| 8,555,273 | B1 | 10/2013 | Chia et al. |
| 8,627,321 | B2 * | 1/2014 | Teichmann ........... H04L 41/082 |
| | | | 707/606 |
| 8,695,001 | B2 * | 4/2014 | Mathew ................ G06F 9/5055 |
| | | | 718/102 |
| 9,691,044 | B2 * | 6/2017 | Hoen, IV ......... G06Q 10/06312 |
| 2004/0098421 | A1 | 5/2004 | Peng |
| 2005/0033625 | A1 | 2/2005 | Kline |
| 2007/0192763 | A1 | 8/2007 | Helvick |
| 2008/0301667 | A1 * | 12/2008 | Rao ........................... G06F 8/65 |
| | | | 717/172 |
| 2010/0082559 | A1 | 4/2010 | Sumcad et al. |
| 2014/0047425 | A1 | 2/2014 | Thapar et al. |
| 2015/0212808 | A1 | 7/2015 | Mandava |

OTHER PUBLICATIONS

"Automatic Maintenance", Retrieved on: May 4, 2016 Available at: https://msdn.microsoft.com/en-us/library/windows/desktop/hh848037(v=vs.85).aspx.

"How to Change Automatic Maintenance Settings in Windows 10", Published on: Nov. 27, 2014 Available at: http://www.tenforums.com/tutorials/3090-automatic-maintenance-change-settings-windows-10-a.html.

* cited by examiner

MAINTENANCE TASKS BASED ON DEVICE ROLE

CROSS-REFERENCE TO RELATED APPLICATIONS

This application claims the benefit of and priority to U.S. Provisional Patent Application Ser. No. 62/326,398 filed on Apr. 22, 2016 and entitled "Maintenance Tasks Based on Device Role," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Many operating systems pick an arbitrary time to do maintenance work. For example, an operating system may apply updates overnight at 2 am because most people are sleeping then and the device is not in active use. For security guards on night shifts, this interrupts their job because, for example, they may not be able to view the security cameras while updates are being installed. Thus, arbitrary times selected by an operating system for performing update activities may negatively affect users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of updating a computing device. The method includes identifying a defined computing system role for the computing device. The method further includes, based on the defined computing system role for the computing device, identifying a schedule for performing maintenance tasks for the computing device at the computing device corresponding to the defined computing role for the computing device. The method further includes performing one or more maintenance tasks for the computing device according to the identified schedule.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In some embodiments illustrated herein, various tasks such as account management, updates, virus scanning, and other maintenance tasks are done when the user is not using the device so it is ready for the user to use without interruptions. This is based on the device's role and potentially how users interact with the device.

In particular, there is a balance between traditional device maintenance tasks and uptime of the device. Devices that provide online services are often marketed with uptime guarantees. Often, device maintenance and uptime collide, impacting maintenance tasks and frustrating users because they cannot use the device when they need to. By enabling the device for a role (i.e., a specific predefined purpose), the device can smartly manage when maintenance work items happen but not get in the way of active use by a user.

A device may have a specific role which defines when it is in active use. Embodiments may prioritize and balance maintenance tasks and active use of the device.

As will be illustrated in more detail below, some of the tasks that may be performed based on a device role may include one or more of: updates (e.g., system, application, operating system, app store, security, etc. updates); virus scanning; disk defragmentation; deleting temporary accounts; adding additional accounts to a device; downloading content; etc.

Figure 1:
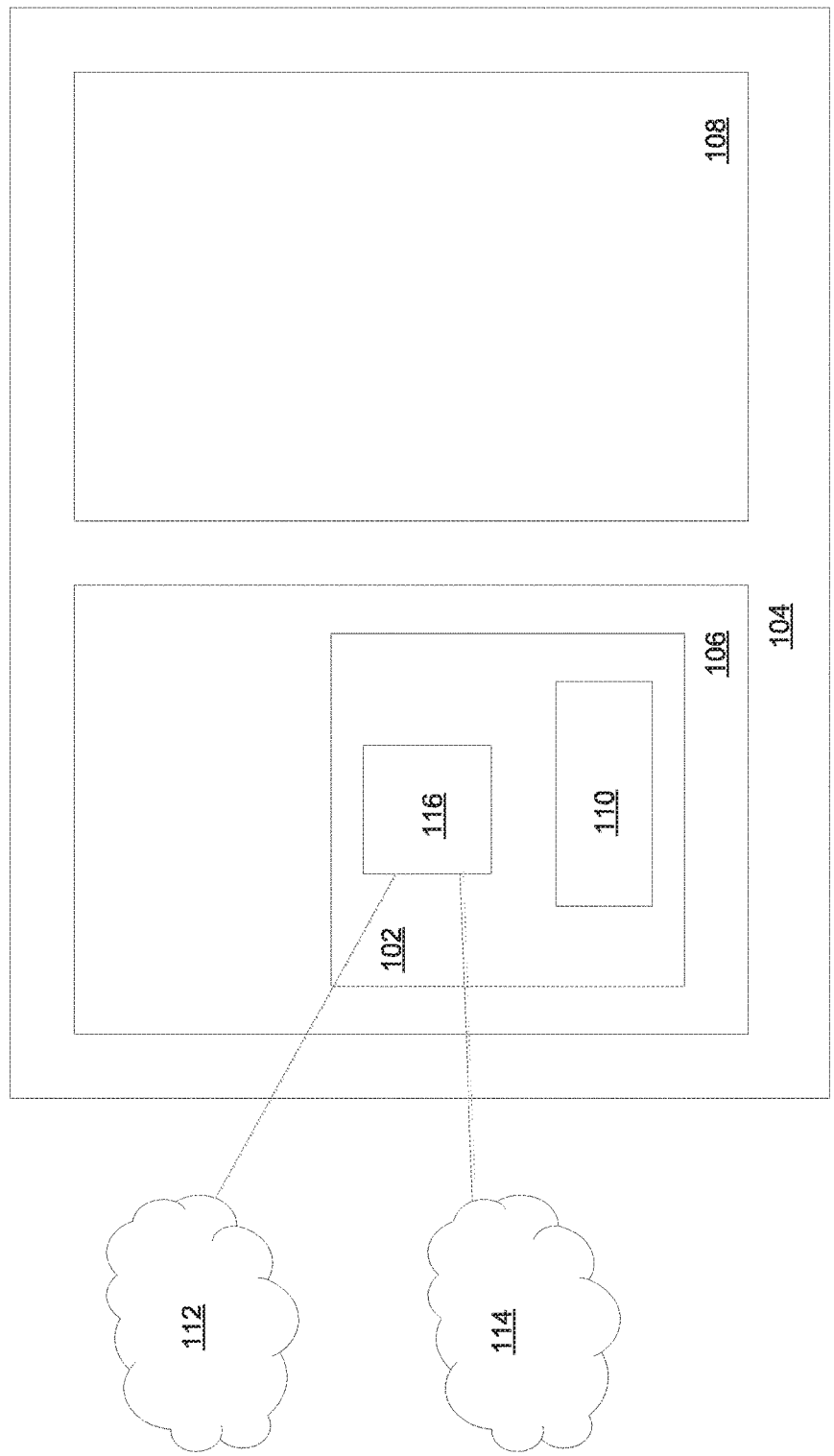
FIG. 1 illustrates a device implemented in an environment where the device can have different roles.

Referring now to FIG. 1 an example is illustrated. FIG. 1 illustrates a device 102. The device 102 is deployed in an environment 104. For example, the environment 104 may be an enterprise (i.e., a work environment). Alternatively or additionally, the environment 104 may be an educational environment. Alternatively or additionally, the environment 104 may be a home environment. Those of skill in the art will recognize that the environment 104 can be any one of a number of different environments.

The device 102 is configured to have a particular predefined device role. The device role is not necessarily dependent on user roles of users who use the device 102. Rather, the device role may independently specific to the device 102 itself. In particular, the device is defined as a particular type of device to be used for a particular use.

Configuring the device to be in a role can be done in a number of different fashions. For example, in some embodiments, configuring the device to be in a role can be done by a person configuring the device explicitly deciding what role the device will have. In particular, a user may set a setting on the device.

The role may be associated with predetermined time periods (i.e., schedules). Schedules for each of the roles define one or more of when the device 102 should be active, when the device 102 should be idle, when maintenance tasks should be performed on the device 102, or other factors. Thus, the device is configured in a certain role with predetermined schedules for when the device should be considered in active use. Schedules may be obtained by the device in a number of different fashions. For example, each device may store a correlation of device roles to schedules. In this way, the device 102 can identify schedules by examining locally stored information. Alternatively or additionally, a device 102 may be able to access a remote service that has a correlation of device roles to schedules. The device 102 can obtain the schedules when the role is assigned or changed or at other appropriate times.

The device 102 may be able to provide information to create or modify schedules associated with the device 102. In particular, the device 102 may provide information about when the device is active to identity times when maintenance activities should not be performed. The device 102 may consider interaction (e.g., moving the mouse) to determine when it is in active use. Alternatively or additionally, the device may use sensors (such as proximity sensors) to determine when it is in active use. For example, the device may have proximity detection hardware to be able to detect the presence of a user by various means. For example, the device 102 may be able to detect the presence of a user's smart phone or a user's smart card or other device. Alternatively or additionally, the device 102 may include camera, infrared, or other technology to detect movement, body heat or other indicators of user presence near the device 102. This proximity information can be used to help define when a device 102 is active and when the device 102 idle. This can be correlated with the device role to identify times for a device role when a device can have maintenance tasks performed.

Alternatively or additionally, the device 102 uses history of the user to determine when users are likely to not be using the device. In some embodiments schedules may be adjusted dynamically for a particular device role based on user feedback or machine learning algorithms.

In some embodiments, the device role may be determined by various factors. For example, as illustrated in FIG. 1, the device may be located in different portions of the environment 104. Thus for example, when the device 102 is located in a first location 106, then the device may be considered to be in a working device role. Alternatively, if the device is located in a second location 108, the device 102 may be considered to be in a maintenance device role. A device with a working device role may have different schedules than a device with a maintenance device role. Thus for example, when the device 102 is located in the first location 106 it may be available for updates outside the hours of 9:00 AM to 5:00 PM. Alternatively, when the device is in the location 108, it may be available for updates any time.

The device 102 may have location hardware 110 that is configured to identify where the device 102 is located. For example, the device 102 may include RFID tags, network hardware, GPS hardware, or other hardware configured to be used in identifying the device 102 location.

In one example embodiment, the device 102 may have its role defined based on the network that the device 102 is connected to. Thus for example, when the device 102 is connected to a first network 112 using communication hardware 116 (such as WiFi, Bluetooth, wired network, or other connections), the device 102 may be considered a working device as its role. Alternatively, when the device 102 is connected to a second network 114, the device 102 may be considered to be a maintenance device as its role.

Other device roles may be such roles as home use role, child use role, student use role, teacher use role, administrator use role, etc.

Keep in mind that any user using the device 102 will use the device in the role for which the device has been configured and not necessarily the user role of the user. Thus, for example, even though an individual user may have a user role of teacher, if that a user logs onto a device that is configured in a student role, the device nonetheless remains a student role device.

Thus, the role of the device 102 is independent of the role of the user using the device 102.

Consider the following example. The default configuration of an operating system installs updates at 2 a.m. For security guards on a night shift, this interrupts their job because they cannot view the security cameras while updates are being installed.

Instead, the operating system on the device 102 can be configured such that the device 102 is a "night shift device" and flips the maintenance task schedule to run during the day.

Alternatively or additionally, if the device 102 detects that the security guard is within three feet of the device 102, it prevents maintenance tasks from starting In another example, a student should not be interrupted by a maintenance tasks during class, especially if they are taking a test. The default configuration of the operating system attempts to install updates right away after it is turned on if it could not install it at its predetermined time of 2 am. This means students are interrupted as soon as they turn on the device Instead, the operating system on the device 102 can be configured such that the device 102 is in a "school device" role which prevents any maintenance tasks from running during school hours Balancing when the user can use the device and when maintenance tasks are performed may not always be as straightforward as "don't do maintenance tasks while the device is in active use." Depending on the priority, necessity, or other requirements of both the user task and maintenance task—the system can decide which operation to perform.

Consider the following examples:

If the user is watching streaming television, but there is a maintenance task to install a critical security update, the system may decide that installing a critical security update is more important than the user watching streaming television and proceed with the maintenance task and interrupt the user.

If the user is attempting to sign into the device, but there is not enough free disk space, a maintenance task to clean up the disk or delete other user profiles on the device could be run first, interrupting the user to clear space for them.

If the user is doing a presentation but there is a maintenance task to install a critical security update, the system may decide that not interrupting the user's presentation is acceptable, and defer the maintenance task.

Some embodiments may implement various user settings and factors when determining when to update the device 102. The following illustrates some examples:

The operating system may detect when the device is idle through sensors and user input.

The operating system may allow specifying when the device should never apply updates, called Active hours.

The operating system may allow specifying when the device is in a specific role, such as Shared PC.

The operating system may require some maintenance tasks to be stoppable.

In some embodiments, when the device 102 is idle, a maintenance task can be started. However, if the device is in active use again after a couple seconds, the maintenance task is stopped.

The operating system may be able to apply different resource priorities to maintenance tasks—such as disk or CPU priority so that maintenance tasks can run as long as they are lower priority than user work The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
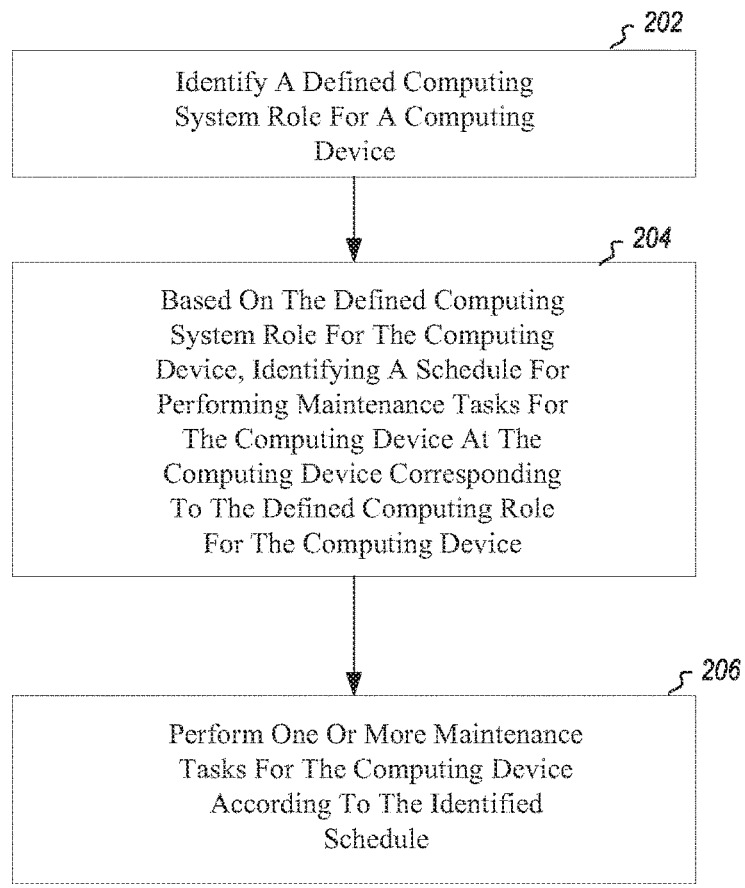
FIG. 2 illustrates a method of updating a computing device.

Referring now to FIG. 2, a method 200 is illustrated. The method 200 may be practiced in a computing environment. The method 200 includes acts for updating a computing device.

The method 200 includes identifying a defined computing system role for the computing device (act 202). For example, the role may be identified by examining a setting in the operating system. Various alternatives such as device location and network connections may alternatively or additionally be used to determine device role.

The method 200 further includes based on the defined computing system role for the computing device, identifying a schedule for performing maintenance tasks for the computing device at the computing device corresponding to the defined computing role for the computing device (act 204).

The method 200 further includes performing one or more maintenance tasks for the computing device according to the identified schedule (act 206).

The method 200 may be practiced where performing maintenance tasks comprises performing updates. For example, the updates may include application updates. Alternatively or additionally, the updates may include operating system updates. Alternatively or additionally, the updates may include application store (e.g., market) updates. Alternatively or additionally, the updates may include security updates.

The method 200 may be practiced where performing maintenance tasks comprises performing virus scanning.

The method 200 may be practiced where performing maintenance tasks comprises performing disk defragmentation.

The method 200 may be practiced where performing maintenance tasks comprises performing user account maintenance. For example, embodiments may delete all or portions of user accounts that are not in use. In an alternative embodiment, maintenance tasks may include adding additional user accounts. For example, the device role may be "home machine". Maintenance tasks may include adding family members accounts.

The method 200 may be practiced where performing maintenance tasks comprises downloading content.

The method 200 may be practiced where the computing system role is based on the location of the computing device. For example, as illustrated in FIG. 1, the computing device 102 may have a role determined by being in a location 106 and may have a different role by being in a location 108.

The method 200 may be practiced where the computing system role is based on the network to which the computing device is connected. For example, as illustrated in FIG. 1, the device 102 may have a particular role when connected to a network 112, and a different role when connected to the network 114.

Note that in some embodiments, the change in the role of the device 102 may trigger the performance of various maintenance tasks. Thus for example, a change in location or network may trigger the initiation of maintenance tasks due to a change in the device role of the device 102.

The method 200 may be practiced where the computing system role is based on a purpose for which the computing device will be used. Thus for example, the device used in a school environment may have a student role or a teacher role. This may result in the device is having different schedules depending on the device role. Thus, in some embodiments the computing device will be used for classroom purposes.

In alternative embodiments the computing device will be used on a factory floor. Note that the device 102 may have a different role when it is on the floor of a factory as compared to when it is no longer on the floor of the factory. Thus, for example, the device 102 may be a working device with a working role when it is on the factory floor. When the device 102 is wheeled off of the factory floor, it may be a maintenance device with a maintenance role.

In alternative embodiments the computing device will be used as a night watchman camera monitoring station.

The method 200 may be practiced where performing maintenance tasks is performed in a way where tasks are prioritized based on the computing device role. Thus for example, the role of the computing device may not only define the schedule generally for performing maintenance tasks, but may also define the order or prioritization of maintenance tasks.

In some embodiments, prioritization of tasks for a given device role may be specified in the schedule itself.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to update a computing device, including instructions that are executable to configure the computer system to perform at least the following:
   identify a defined computing system role for the computing device, wherein the defined computing system role defines a specific predefined purpose of the computing device;
   based on the defined computing system role for the computing device, identify a schedule correlated to the defined computing system role, wherein the schedule comprises predetermined time periods, the predetermined time periods defining at least one of when computing devices having the defined computing system role should be active, when computing devices having the defined computing system role should be idle, or when computing devices having the defined computing system role should have maintenance tasks performed;
   based on the predetermined time periods in the schedule, identify one or more times for performing maintenance tasks for the defined computing system role, and thus for the computing device such that the times for performing maintenance on the computing device are directly correlated to and based on the defined computing role for the computing device; and
   perform one or more maintenance tasks on the computing device, at the one or more times identified for maintenance for the defined computing system role according to the identified schedule; and
   wherein the performing one or more maintenance tasks on the computing device comprises performing updates, including at least one of application updates, operating system updates, application store updates, or security updates.

2. The computer system of claim 1 wherein the computing system role is based on the location of the computing device.

3. The computer system of claim 1 wherein the computing system role is based on a network to which the computing device is connected.

4. The computer system of claim 1 wherein the computing system role is based on a manual setting configured at the computing device.

5. The computer system of claim 1 wherein the computing system role is based on a purpose for which the computing device will be used.

6. The computer system of claim 1 wherein performing maintenance tasks is performed in a way where tasks are prioritized based on the computing device role.

7. The computer system of claim 1 wherein one or more computer-readable media further have stored thereon instructions that are executable by the one or more processors to configure the computer system to detect the presence of a user to determine when a device with the computing system role should be idle.

8. A computer implemented method of updating a computing device the method comprising:

identifying a defined computing system role for the computing device, wherein the defined computing system role defines a specific predefined purpose of the computing device;

based on the defined computing system role for the computing device, identifying a schedule correlated to the defined computing system role, wherein the schedule comprises predetermined time periods, the predetermined time periods defining at least one of when computing devices having the defined computing system role should be active, when computing devices having the defined computing system role should be idle, or when computing devices having the defined computing system role should have maintenance tasks performed;

based on the predetermined time periods in the schedule, identifying one or more times for performing maintenance tasks for the defined computing system role, and thus for the computing device such that the times for performing maintenance on the computing device are directly correlated to and based on the defined computing role for the computing device; and performing one or more maintenance tasks on the computing device, at the one or more times identified for maintenance for the defined computing system role according to the identified schedule; and wherein the performing one or more maintenance tasks on the computing device comprises performing updates, including at least one of application updates, operating system updates, application store updates, or security updates.

9. The method of claim 8 wherein the computing system role is based on the location of the computing device.

10. The method of claim 8 wherein the computing system role is based on a network to which the computing device is connected.

11. The method of claim 8 wherein the computing system role is based on a purpose for which the computing device will be used.

12. The method of claim 11 wherein the computing device will be used for classroom purposes, and wherein the schedule for performing maintenance comprises a schedule indicating that maintenance should performed outside, of classroom hours.

13. The method of claim 11, wherein the computing device will he used on a factory floor, and wherein the schedule for performing maintenance comprises a schedule indicating that maintenance should performed outside of factory operation hours.

14. The method of claim 8, wherein performing maintenance tasks is performed in a way where tasks are prioritized based on the computing device role.

15. The method of claim 8, wherein the schedule prioritizes tasks according to a device role.

16. The method of claim 8, further comprising configuring the computer system to detect the presence of a user to determine when a device with the computing system role should be idle.

17. The method of claim 8, further proximity detection hardware configured to detect the presence of a user for use in identifying the schedule.

18. A computing device, including at least one processor, comprising:

a defined computing device role wherein the defined computing device role defines a specific predefined purpose of the computing device;

wherein the computing device is configured, based on the defined computing system role for the computing device, to identify a schedule correlated to the defined computing device role, wherein the schedule comprises predetermined time periods, the predetermined time periods defining at least one of when computing devices having the defined computing device role should be active, when computing devices having the defined computing device role should be idle, or when computing devices having the defined computing device role should have maintenance tasks performed;

based on the predetermined time periods in the schedule, identify one or more times for performing maintenance tasks for the defined computing device role, and thus for the computing device such that the times for performing maintenance on the computing device are directly correlated to and based on the defined computing device role for the computing device; and perform one or more maintenance tasks on the computing device at the one or more times identified for maintenance for the defined computing device role according to the identified schedule; and wherein the performing one or more maintenance tasks on the computing device comprises performing updates, including at least one of application updates, operating system updates, application store updates, or security updates.

19. The computing device of claim 18, further comprising network hardware, and wherein the defined computing device role is based on a network to which the network hardware is connected.

* * * * *